(12) United States Patent
Suminski

(10) Patent No.: US 7,265,475 B2
(45) Date of Patent: Sep. 4, 2007

(54) ELECTRIC MOTOR HAVING CONVEX HIGH-SPEED BRUSH

(75) Inventor: David Suminski, Clinton Township, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 11/089,901

(22) Filed: Mar. 25, 2005

(65) Prior Publication Data

US 2005/0218750 A1 Oct. 6, 2005

Related U.S. Application Data

(60) Provisional application No. 60/557,471, filed on Mar. 30, 2004.

(51) Int. Cl.
*H01R 39/38* (2006.01)
(52) U.S. Cl. .................. 310/248; 310/251; 310/66; 310/99
(58) Field of Classification Search ............... 310/245, 310/248, 251
See application file for complete search history.

(56) References Cited

U.S. PATENT DOCUMENTS

| 2,798,999 A | * | 7/1957 | Coffey .................. 318/475 |
| 5,194,769 A | * | 3/1993 | Ade et al. .................. 310/51 |
| 5,434,463 A | | 7/1995 | Horski .................. 310/248 |
| 5,485,049 A | | 1/1996 | Shannon et al. ............. 310/248 |
| 5,594,290 A | | 1/1997 | Shannon et al. ............. 310/251 |
| 5,691,585 A | * | 11/1997 | Shoda .................. 310/71 |
| 5,780,952 A | | 7/1998 | Lau .................. 310/239 |
| 5,852,352 A | | 12/1998 | Suriano .................. 318/541 |
| 5,909,077 A | | 6/1999 | Bruhn .................. 310/251 |
| 6,163,096 A | | 12/2000 | Michenfelder et al. ..... 310/239 |
| 6,232,695 B1 | | 5/2001 | Klode .................. 310/241 |
| 6,552,466 B2 | | 4/2003 | Schwabbauer et al. ..... 310/248 |
| 6,559,571 B1 | | 5/2003 | Klode .................. 310/241 |

* cited by examiner

*Primary Examiner*—Karl Tamai
*Assistant Examiner*—Erik Preston
(74) *Attorney, Agent, or Firm*—Bliss McGlynn, P.C.

(57) ABSTRACT

A two speed direct current electric motor comprising: an armature having a commutator assembly that is adapted to receive an electromotive force to cause the armature to operatively rotate. A brush assembly having a common brush and a low-speed brush is disposed about and in electrical communication with the commutator to provide a first electromotive force to cause the armature to provide a low-speed rotational output. The brush assembly further includes a high-speed brush having a convex shaped end in physical and electrical communication with the commutator to provide a second electromotive force to cause the armature to provide a high-speed rotational output. The convex shaped end of the high-speed brush is further adapted to wear to take the shape of the commutator such that as the high-speed brush wears the high-speed rotational output decreases.

18 Claims, 4 Drawing Sheets

ELECTRIC MOTOR HAVING CONVEX HIGH-SPEED BRUSH

This application claims priority to and all benefits from the co-pending provisional application having U.S. Ser. No. 60/557,471 filed Mar. 30, 2004 and entitled Electric Motor Having Convex High Speed Brush.

BACKGROUND OF THE INVENTION

1. Field of the Invention

The present invention relates, generally to two-speed electric motors and, more specifically, to a two-speed electric motor having a convex shaped high-speed brush.

2. Description of the Related Art

Direct current (DC) motors are common and used in a wide variety of applications as a source of motive power. DC motors operate by causing an armature to rotate in a magnetic field to produce torque. In one form of DC motor, a magnetic field is developed within the motor case surrounding an armature that consists of a series of wire wound coils, or windings. Each end of each of the armature windings is electrically connected to one segment of a commutator. The commutator is a series of electrically separate cylindrical segments that are placed about the armature shaft. Brushes are set in contact with the commutator to deliver voltage and current flow to the armature windings. The current applied to the armature windings produces an electromagnetic field that interacts with the magnetic field within the motor case. This interaction drives the armature through a portion of its angular rotation. Due to the segmented commutator, the voltage polarity and the current flow will reverse in each of the armature windings at every half cycle of their rotation. This causes the armature to continue to rotate, which in turn produces a torque output on the armature shaft.

Many DC motor applications call for the motor to produce two output speeds. A two-speed DC motor has two sets of brushes, one for low speed and one for high speed. More precisely, it is common practice to employ one common brush that operatively interacts with one low-speed brush and with one separate high-speed brush to provide two different motor speeds. The relative location of the brushes about the commutator determines how many armature windings are connected in the circuit to produce the electromagnetic field to turn the armature. In typical two-speed DC motor construction, the common and low-speed brushes are placed 180 degrees apart. This causes the greatest number of available windings to be electrically charged during the rotation of the armature.

To achieve a high-speed output, the high-speed brush is physically located angularly closer about the commutator to the common brush. Therefore, as the armature turns there are fewer armature windings connected between the common and high-speed brush, than between the common and low-speed brush. This causes the armature to rotate faster when the high-speed brush provides the voltage and current. During the initial wear-in period of conventional two-speed DC motors, the seating of the brushes, and particularly the high-speed brush, causes the motor speed to increase. This is somewhat noticeable when the motor is operating at low speed, but becomes undesirably distinct at the high speed setting. It is common to radially offset the high-speed brush in an attempt to minimize this problem. However, a radial offset of the high-speed brush causes the brush to drag on the commutator and slow the armature during wear-in causing a like undesirable reduction in motor speed.

Furthermore, when running the two-speed DC motor in the high-speed mode, the initially slowed operation during the wear-in period may cause problems for the system it is employed in. Many mechanically complex systems, when newly manufactured, are stiff and require their own break-in period to overcome the initial tightness of the various joints and pivot points and to allow for the provided lubrication to reach all portions of the mechanism.

For example, windshield wiper systems commonly found in motor vehicles most often employ two-speed DC motors as their source of operative power. Conventional motor vehicle windshield wiper systems are mechanically complex with a number of rotating shafts, linkage arms, and pivot points. Additionally, the two-speed DC motors used in windshield wiper systems employ gear reduction assemblies to transfer output torque from the motor to the wiper system. All of the mechanical interaction between the parts of the wiper system and the gear reduction assembly of the DC motor, in addition to the slowed armature speed due to the high-speed brush wear-in cause the high-speed mode in many newly manufactured wiper systems to be nearly as slow as the low speed setting.

Eventually, the wiper system components loosen and the DC motor increases in speed as the break-in and wear-in periods complete. This generally brings the operating speed of the high-speed mode up into a desired speed range. However, this is an undesirably long process often requiring more than an hour of run time at the high-speed setting. Furthermore, when the motor speed increases and the wiper system loosens, the resultant speed change in the high-speed setting may be excessively high. For automotive manufacturers, this results in a high number of new car owner complaints regarding the high-speed operation of the wiper system.

Accordingly, there remains a need in the related art for a DC motor with an improved high-speed brush that does not increase or maintain its high-speed output as the high-speed brush wears in. Further, a need exists for a DC motor with an improved high-speed brush that has an initially faster high-speed output so that it may be employed in a newly manufactured mechanical system to overcome any speed reduction caused by the stiffness of the new system. Finally, there remains a need for a DC motor with an improved high-speed brush that subsequently reduces its initially faster high-speed output to a desired level after a certain period of time so that it may be employed in a newly manufactured mechanical system, to first overcome any speed reduction caused by the stiffness of the new system, and to second slow as the system loosens so that no apparent change in the system speed occurs.

SUMMARY OF THE INVENTION

The disadvantages of the related art are overcome by the two-speed direct current electric motor of the present invention that includes an armature having a commutator assembly that is adapted to receive an electrical current to cause the armature to operatively rotate. The motor also includes a brush assembly having a common brush and a low-speed brush that are disposed about and in electrical communication with the commutator and adapted to provide the armature with a first operative electrical current to cause the armature to rotate. The brush assembly further includes a convex end in physical and electrical communication with the commutator. The convex high-speed brush provides the armature with a second operative electrical current to cause the armature to rotate at a higher speed than the first current.

The convex high-speed brush is further adapted to cause the rotational speed of the armature to decrease as the high-speed brush wears to take the shape of the commutator.

Thus, the present invention overcomes the limitations of the prior art DC motors by providing a DC motor with an improved high-speed brush that does not have an initially slowed high-speed output during the brush wear-in period. Further, the present invention overcomes the limitations of the prior art DC motors by providing a DC motor with an improved high-speed brush that has an initially faster high-speed output so that it may be employed in a newly manufactured mechanical system to overcome any speed reduction caused by the stiffness of the new system. Finally, the present invention overcomes the limitations of the prior art DC motors by providing a DC motor with an improved high-speed brush that subsequently reduces its initially faster high-speed output so that it may be employed in a newly manufactured mechanical system to first, overcome any speed reduction caused by the stiffness of the new system, and to second, slow as the system loosens so that no apparent change in the system speed occurs.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
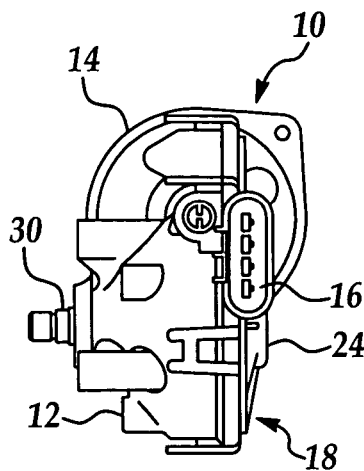
FIG. 1 is an end view of a DC motor having a convex high-speed brush of the present invention.
Figure 2:
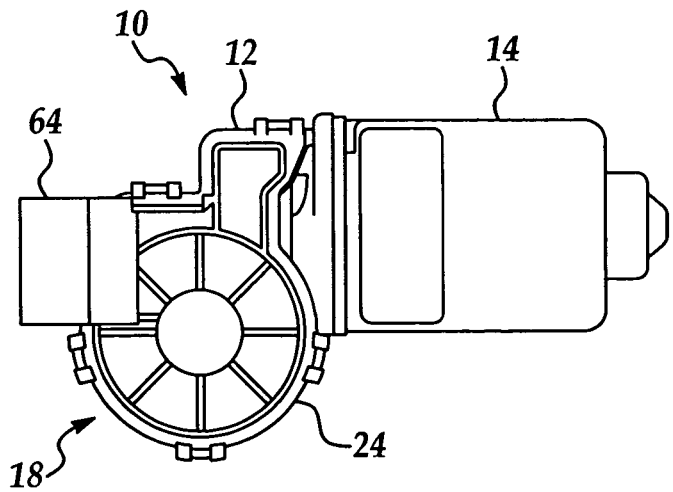
FIG. 2 is an side view of the DC motor of FIG. 1.
Figure 3:
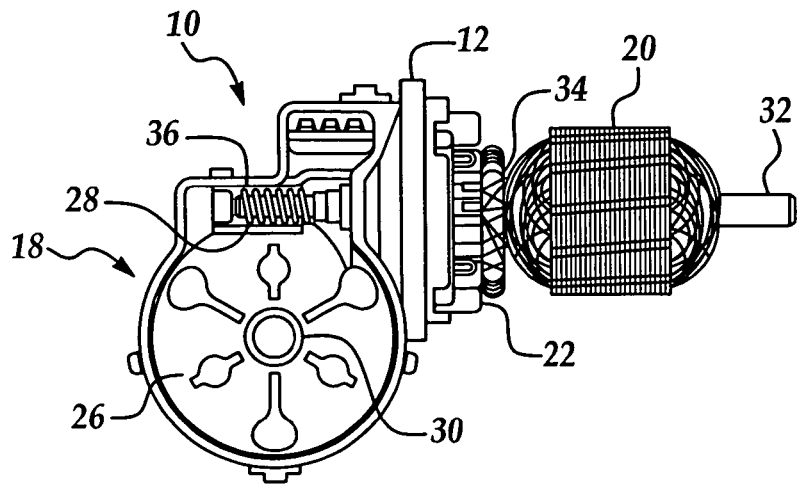
FIG. 3 is another side view of the DC motor of FIG. 1 with covers removed for clarity.

Referring now to the Figures, a two-speed DC motor of the present invention is generally indicated at 10 in FIGS. 1, 2, and 3 where like numerals are used to designate like structure. These Figures illustrate various views of the two-speed DC motor 10, which includes a main body 12, an armature case 14, and an electrical connector 16. The two-speed DC motor 10 illustrated herein is of a type that may be employed with a mechanical system that requires a stepped down motor output. Thus, as illustrated, the main body 12 may include a gear assembly generally indicated at 18, a wire wound armature 20, and a brush plate assembly 22. In FIG. 3, the cover plate 24 of the gear reduction assembly 18 and the armature case 14 are removed for clarity.

The gear reduction assembly 18 includes a drive wheel 26 that has teeth 28 formed about it outer circumference. A motor drive shaft 30 is fixedly mounted to the center of the drive wheel 26. The armature 20 includes a shaft 32 and commutator assembly 34. The armature 20 is operatively mounted in the motor 10 on bearings located in the armature case and main body (not shown). The armature shaft 32 has a worm gear 36 formed on one end that operatively interacts with the teeth 28 of the drive wheel 26 to cause the motor drive shaft 30 to rotate in response to the rotation of the armature 20. The gear reduction assembly 18 provides a predetermined gear reduction ratio so that the speed of the armature 20 is reduced and the motor drive shaft 30 produces the desired speeds for the application. It should be appreciated that based on the specific design of the gear reduction assembly 18, a torque multiplication effect may also be provided.

It should be further appreciated that the DC motor illustrated herein is of a permanent magnet (PM) type, in which the magnetic field set up to influence the armature is generated by permanent magnets disposed about the inner diameter of the armature case 14. The brush plate assembly 22 is shown in detail in FIG. 4 and includes a brush mounting plate 40 having a commutator opening 42 that is adapted to fit over the commutator assembly 34. A common brush assembly generally indicated at 44, a low-speed brush assembly generally indicated at 46, and a high-speed brush assembly generally indicated at 48 are fixedly mounted to the brush mounting plate 40. The common brush assembly 44 includes a brush holder 50, a biasing member 52, and the common brush 54. The low-speed brush assembly 46 includes a brush holder 56, a biasing member 58, and the low-speed brush 60. The high-speed brush assembly 48 includes a high-speed brush holder 62, a high-speed brush biasing member 64, and the high-speed brush 66. The biasing members 52, 58, and 64 are disposed within their respective brush holders 50, 56, and 62 such that they provide a continuous biasing force to cause the brushes 54, 60, and 66 to maintain continuous contact with the commutator 24. The brush holders 50, 56, and 62 are constructed of a non-conductive material so that voltage may be applied to the commutator 24 via the brushes 54, 60, and 66 while they remain electrically isolated from each other. The electrical connector 16 provides the necessary electrical communication with the proper source of electrical power to supply the brushes 54, 60, and 66 for operating the motor 10. In the embodiment illustrated herein, the biasing members 52, 58, and 64 are each wound springs. However, those having ordinary skill in the art will appreciate that any biasing member that provides sufficient biasing force would properly function in this application.

As previously discussed, the common brush 54 and low-speed brush 60 are placed 180 degrees apart, this causes the greatest number of available windings to be electrically charged during the rotation of the armature. Due to the nature of the commutation feature of a DC PM motor, placing the low-speed brush 60 and high-speed brush 66 at different angular locations from the common brush 54 will result in different armature speeds. This relates to the amount of counter-electromotive force (CEMF) that is generated in the armature windings as they pass through the magnetic field of the permanent magnet. More specifically, whenever a wire conductor, such as an armature winding, passes through a magnetic field, a current is generated in the conductor. This generated current induced in the windings is completely separate from the current supplied to the armature to cause it to rotate. In fact, the current induced in the armature windings by the rotation of the armature in the magnetic field is opposite to the current provided to the armature to produce the electromagnetic field in the windings for armature rotation. This induced opposing current reduces the supplied current and is referred to as the counter (or back) electro-motive force (CEMF).

The relative location of the brushes determines how many armature windings are connected in the circuit to produce the electromagnetic field to turn the armature 20. As is typical in DC PM wiper motor construction, the common and low-speed brushes 54, 60 are placed 180 degrees apart, this causes the greatest number of available windings to be electrically charged during the rotation of the armature 20. For this brush positioning and thereby for the given current applied to the armature windings, a particular amount of CEMF opposes the delivered current flow and limits the armature speed.

The high-speed brush 66 is physically located angularly closer about the commutator 34 to the common brush 54. Therefore, as the armature 20 turns (counter-clockwise) there are fewer armature windings connected between the common 54 and high-speed brush 66, than between the common 54 and low speed 60 brush. This causes two things to occur. First, since fewer armature windings are electrically involved there is less CEMF generated to oppose the supplied current. Second, with less CEMF in the armature windings involved, greater forward current will flow through the armature windings that are being charged. Thus, greater armature current with lower CEMF results in a higher motor speed when using the high-speed brush 66.

Figure 6A:
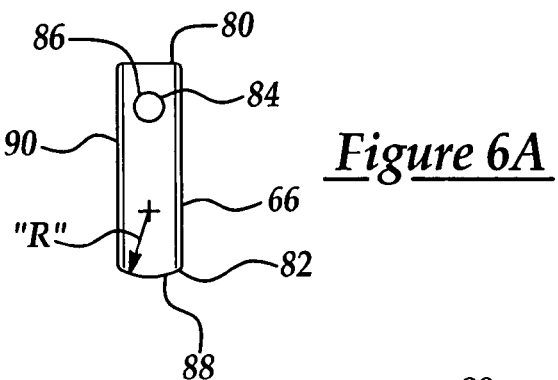
FIG. 6A is a top view of a convex high-speed brush of the present invention.
Figure 6B:
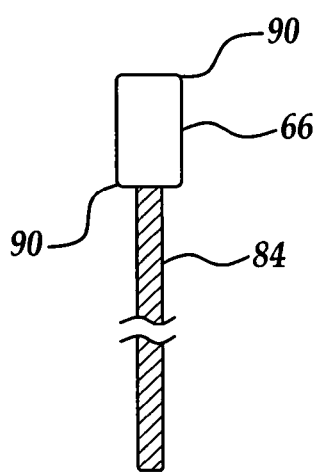
FIG. 6B is an end view of a convex high-speed brush of the present invention.
Figure 6C:
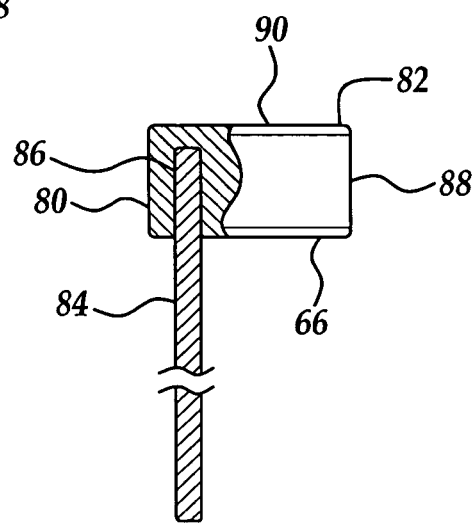
FIG. 6C is a side view of a convex high-speed brush of the present invention.

As shown in detail in FIGS. 6A through 6C, the present invention provides a high-speed brush 66 that includes a shunt end 80 and a commutator end 82. The shunt end 80 is so named for having a flexible electrical conductor or shunt 84 formed into the brush material at 86. The flexible shunt 84 allows the brush 66 to be electrically and fixedly connected to the motor circuits while allowing the brush to be biased toward, and maintain continual contact with, the commutator 34 as the commutator end 84 wears down throughout its operational life.

The high-speed brush 66 further includes a convex curve 88 on its commutator end 82. More specifically, in one embodiment, the commutator end 82 has a radiused convex curve 88 that is geometrically formed as a chord that has a radius in the range of 5 to 10 mm. In the preferred embodiment, the chord radius has a 7 to 8 mm radius "R". Additionally, it should be appreciated that the convex high-speed brush 66 has chamfered edges 90 to avoid sticking in the brush holder 48. It should be appreciated that the radius R of the chord may vary without departing from the scope of the invention.

Figure 4:
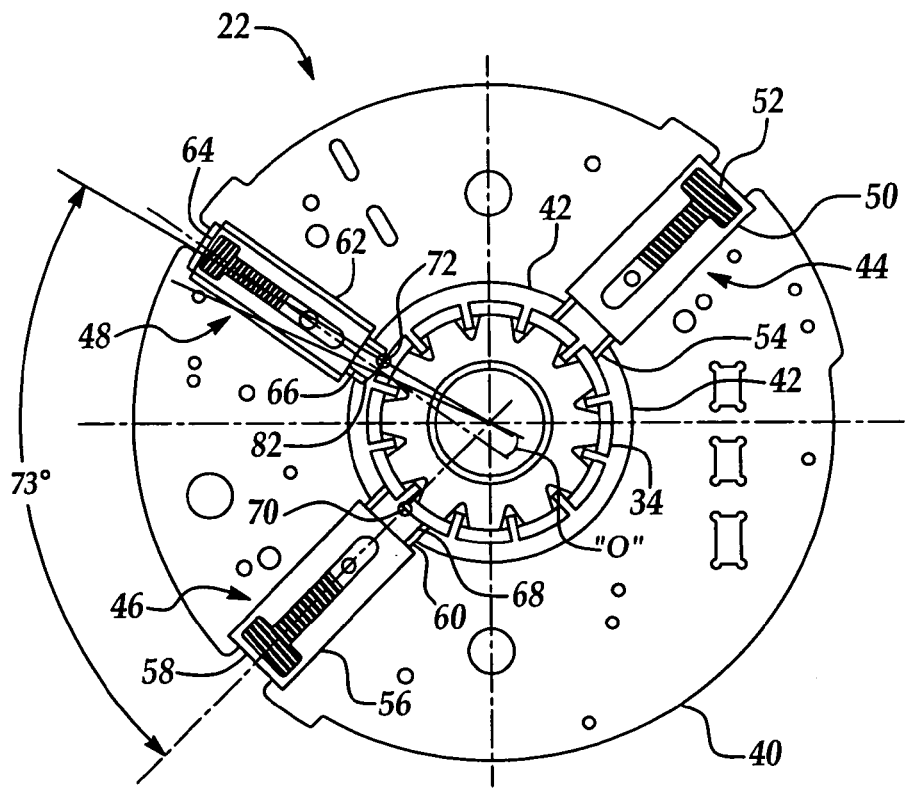
FIG. 4 is a top view of a brush assembly for a DC motor of the type employed by the present invention for a vehicle wiper system in its initial unworn state.

As previously discussed, the speed of the armature 20 in the high-speed mode is controlled by the angular location of the high-speed brush 66 on the commutator 34 with respect to the low-speed brush 60. More specifically, the armature speed is controlled by the angular location of the electrically resultant contact points of the low and high-speed brushes 60 and 66 with respect to the common brush 54. With reference to FIG. 4, the low-speed brush 60 is formed having a concave commutator end 68 that is preformed to generally have the same radial shape as the circumference of the commutator 34 The electrically resultant contact point of the low-speed brush 60 is at the radial center of the brush as indicated at 70. In this manner, the common brush 54 and the low-speed brush 60 are disposed about and in electrical communication with the commutator 34 and are adapted to provide a first current or electromotive force to cause the armature 20 to spin and provide a low-speed rotational output.

As further illustrated in FIG. 4, the high-speed brush 66 is radially offset from the commutator 20 as mounted on the brush mounting plate 40 in a range of 5 to 10 degrees as shown at "O". In the preferred embodiment, the offset falls between 7 to 8 degrees. This offset is measured from the center of the armature 20 through the outer diameter of the commutator 34 with respect to the centerline of the high-speed brush 66. Since the high-speed brush 66 includes the convex shaped commutator end 82, imparting an offset angle to the high-speed brush 66 causes the electrical contact point 72 of the high-speed brush 66 to be off-center. As illustrated, the offset electrical contact point of the high-speed brush 66 at 72 is a located at a particular angular distance from the electrical contact point of the low speed brush 60 with respect to the commutator 34. For the purposes of illustration, FIG. 4 indicates that position 72 of the high speed brush is offset from the low speed brush by 73 degrees. However, it should be appreciated that the angular differential from the low speed brush provides high speed of the motor such that any offset angle may be employed depending upon the desired high speed output.

Figure 5:
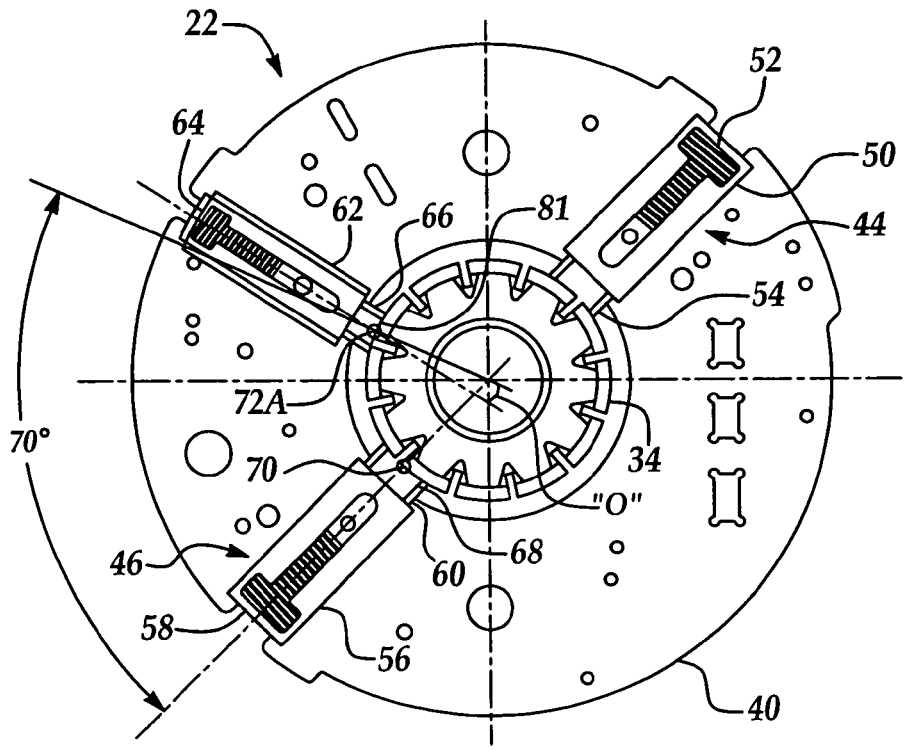
FIG. 5 is a top view of a brush assembly for a DC motor for a vehicle wiper system after a wear-in period.

By itself, this merely provides a DC PM wiper motor with the capability of providing a low speed mode and a high-speed mode. However, as illustrated in FIG. 5, when the convex commutator end 82 of the high-speed brush 66 wears in and seats against the commutator 34, the commutator end 82 of the high-speed brush 66 wears down to take on the radial shape of the commutator 34. This results in a angular movement of the electrical contact point for the high-speed brush 66 from its initial position at 72 as shown in FIG. 4 to the final contact point 72A as shown in FIG. 5.

The final contact point 72A is angularly closer to the low-speed brush contact point 70 than the initial starting point at 72 in FIG. 4, such that the angular difference between the electrical contact points of the low and high-speed brushes 60 and 66 is now 70 degrees. Therefore, in the counter-clockwise rotation of the armature, more armature windings are energized between the common brush 54 and the high-speed brush 66 at the final contact point 72A than at the initial contact point 72. Thus, considering the above discussion with regard to CEMF, the speed of the electric motor of the present invention having a convex high-speed brush decreases as the convex high-speed brush 66 wears from its initial electrical contact point 72 to its final electrical contact point 72A. This is directly contrary to prior art DC motors that employ high-speed brushes that either maintain or increase their angular difference between the low speed and high-speed brush contact points, which in turn causes the prior art DC motors to be either maintain their initial speed or increase their speed as the high-speed brush wears. It should be appreciated that the final angular offset of the high speed brush indicated in FIG. 5 for position 72A is merely representative of the decrease of the overall angular offset from the initial contact point shown in FIG. 4 at position 72. Thus, any decrease of the angular offset of the contact point of the high-speed brush from its initial position to its wear-in position is within the scope of the present invention and the particular angles illustrated herein are not limiting.

The final high-speed brush contact point 72A shown in FIG. 5 produces the desired high-speed rotational output after brush wear-in. In other words, the reduction of the angular difference between the contact points (72 and 72A) of the high-speed 66 and low speed 60 brushes during wear-in of the high-speed brush 66 of the present invention provides for a high-speed output that is initially higher (at 72) than the final high-speed output (at 72A). Furthermore, the angular offset of the high-speed brush 66 provides for reduced drag on the armature 20 by the contact of the high-speed brush 66 on the commutator 34 both during the wear-in period and afterward. Thus, the present invention overcomes the limitations of the prior art DC motors by providing a DC motor with an improved high-speed brush that the high-speed rotational output decreases as the high-speed brush wears in.

It should be appreciated that it is advantageous to employ the DC motor of the present invention as a source of motive power for any of a variety of mechanical systems. For example, a representative windshield wiper system for a motor vehicle that may be operatively driven by a DC wiper motor of the present invention is generally indicated at 100 in FIG. 7. The windshield wiper system 100 is installed in a motor vehicle 110 and is employed to clean the glass windshield 120 of the vehicle 110. The vehicle 110 includes a cowl 112, a roof 114 and a pair of laterally spaced front or "A" pillars 116 extending between the roof 114 and the cowl 112. The A-pillars 116, roof 114 and cowl 112 cooperate to define a generally rectangular opening 118 in which is supported a curved or "swept back" glass windshield 120.

Figure 7:
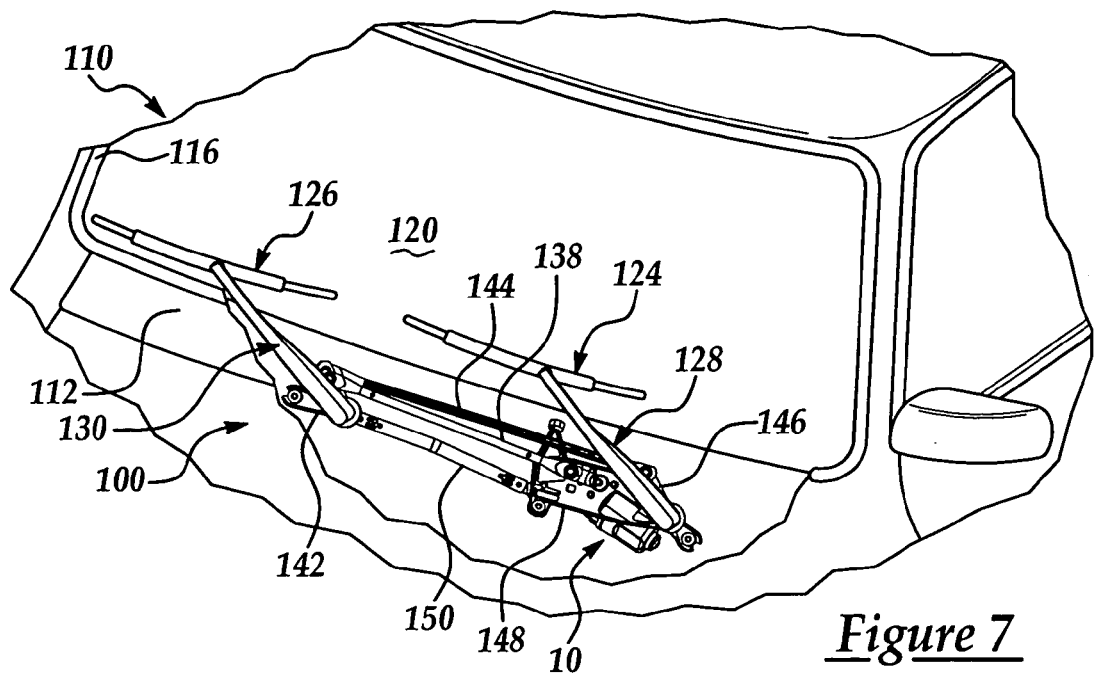
FIG. 7 is a partial schematic illustration of the front of an automotive body having a windshield wiper system with a DC motor having a convex high-speed brush of the present invention.
Figure 8:
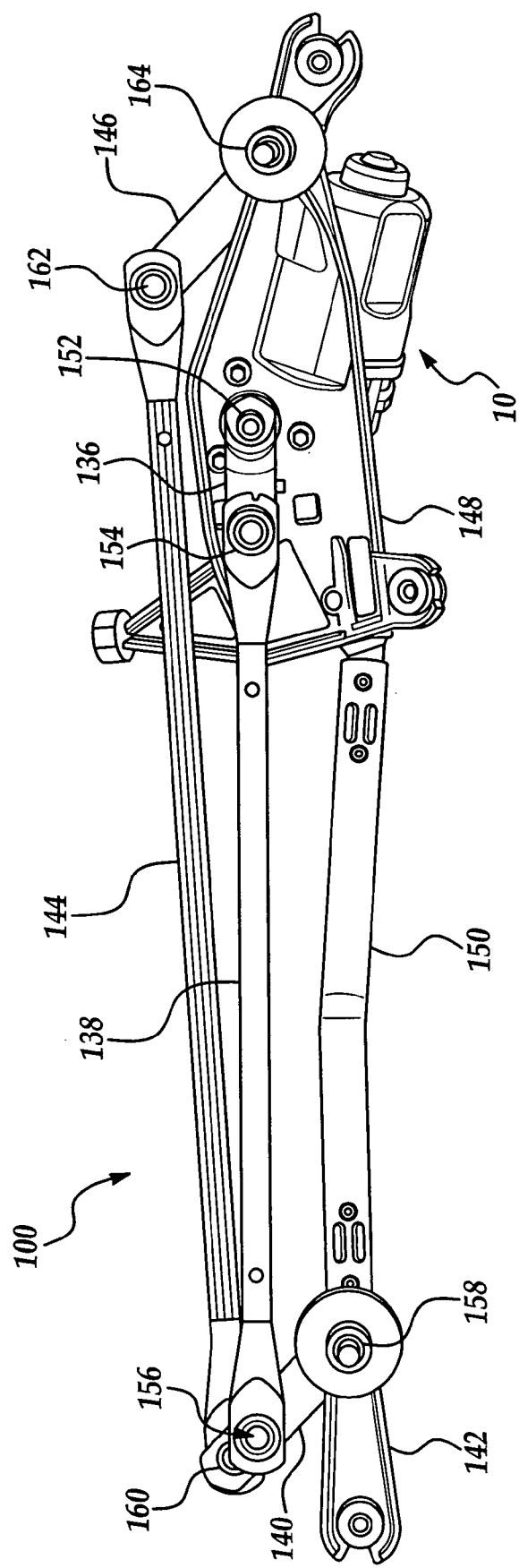
FIG. 8 is a side view of a two-armed, mechanically linked wiper system of a type that may employ the DC motor having a convex high-speed brush of the present invention.

The system 100 includes a pair of wiper assemblies, generally indicated at 124 and 126, which are adapted to be moved reciprocally across a windshield of a vehicle, each corresponding to the driver (left) and passenger (right) side of the vehicle, respectively. Each wiper assembly 124, 126 is carried by a corresponding wiper arm assembly, generally indicated at 128, 130, respectively. As seen in greater detail in FIG. 8, the windshield wiper system 100 includes a DC wiper motor of the present invention generally indicated at 10, a motor lever 136, a drive connecting arm 138, a right lever arm 140, a right pivot body 142, a slave connecting arm 144, a left lever arm 146, a left pivot body 148, and a unitizing tube 150. The unitizing tube 150 spans between and rigidly fixes the right pivot body 142 to the left pivot body 148. As shown in FIG. 7, when installed in the vehicle 110, the right pivot body 142 and the left pivot body 148 are fixedly mounted to the vehicle.

The DC motor 10 is mounted in the left pivot body 142 with its drive shaft 152 extending through and operatively connected to the motor lever 136. The motor lever 136 attaches to the drive-connecting arm 148 at rotational point 154. The drive-connecting arm 138 operatively connects to the right lever arm 140 at pivot point 156. Opposite pivot point 146, the right lever arm 140 includes a right wiper shaft 158 that extends through and pivotably mounts to the right pivot body 142. The right wiper shaft 158 is operatively connected to the right wiper arm assembly 140 (FIG. 7). In this manner, the rotational movement of the motor lever 136 is converted to a linear movement at rotational point 154, pivot point 156, and the right wiper shaft 158, which then sweeps the right wiper arm assembly 140 back and forth across the windshield 120 of the vehicle 110.

The right lever arm 140 further includes pivot point 160, at which the slave-connecting arm 144 is pivotably mounted to the right lever arm 140. The slave-connecting arm 144 is further pivotably mounted to the left lever arm 146 at pivot point 162. Opposite pivot point 162, the left lever arm 146 includes a left wiper shaft 164 that extends through and pivotably mounts to the left pivot body 148. The left wiper shaft 164 is operatively connected to the left wiper arm assembly 138 (FIG. 7). In this manner, the linear movement at pivot point 162, the slave connecting arm 144, and the left wiper shaft 164 causes the left wiper arm assembly 138 to sweep back and forth across the windshield 120 of the vehicle 110.

When newly manufactured, the various pivot and rotational points of the wiper system 100 are stiff and the lubricant used during assembly is not well distributed. Additionally, as previously discussed, the two-speed DC motor employed in the wiper system 100 uses a gear reduction assembly 18 to transfer output torque from the motor 10 to the wiper system 100. The gear reduction assembly 18 is also stiff when newly manufactured and its assembly lubricant is similarly not well distributed. Thus, all of the mechanical interaction between the parts of the wiper system 100 and the gear reduction assembly 18 of the DC motor 10 combine to present an increased mechanical load to the DC motor 10 during its wear-in period. However, as highlighted above, the convex high-speed brush 66 of the present invention runs the DC motor 10 slightly faster initially in the high-speed mode to overcome the stiffness of the new wiper system and the gear reduction assembly. Thus, the present invention overcomes the limitations of the prior art DC motors by providing a DC motor with an improved high-speed brush that has an initially faster high-speed output so that it may be employed in a newly manufactured mechanical system to overcome any speed reduction caused by the stiffness of the new system.

Finally, as the components of the wiper system 100 loosen and become better lubricated, the mechanical force required to drive them lessens. As found in the prior art systems, were the DC motor to simultaneously increase in speed due to the high-speed brush wear-in against the commutator, the overall wiper system speed would increase excessively. Likewise, were the DC motor to remain at the same speed, the resulting looseness in the wiper system and gear reduction assembly would cause noticeable and undesirable speed changes in the wiper system. However, as highlighted above, the DC motor 10 of the present invention causes a reduction in the high-speed output as the convex high-speed brush 66 wears in. Thus, the increasing looseness of the wiper system 100 as it breaks in and becomes well lubricated is balanced by the slowing of the motor as the convex high-speed brush 66 wears in, which results in no discernable change in wiper system speed. In other words, the wiper system 100 always sweeps the windshield at substantially the same rate in the high-speed mode throughout its service life. In this manner, new car owner complaints regarding the high-speed operation of the wiper system may be reduced. Thus, the present invention overcomes the limitations of the prior art DC motors by providing a DC motor with an improved high-speed brush that subsequently reduces its initially faster high-speed output so that it may be employed in a newly manufactured mechanical system to first, overcome any speed reduction caused by the stiffness of the new system, and to second, slow as the system loosens so that no apparent change in the system speed occurs.

The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

I claim:

1. A two speed direct current electric motor comprising:
an armature having a commutator, said commutator adapted to receive an electromotive force to cause said armature to operatively rotate;
a brush assembly having a common brush and a low-speed brush that is disposed about and in electrical communication with said commutator and adapted to provide a first electromotive force to cause said armature to provide a low-speed rotational output;
said brush assembly further including a high-speed brush having a convex shaped end in physical and electrical communication with said commutator to provide a second electromotive force to cause said armature to provide a high-speed rotational output, said high-speed brush radially offset from said commutator such that said convex shaped end and said radial offset of said high-speed brush provide an electrically resultant contact point with respect to said commutator that is off center of said high-speed brush so that the drag placed on said armature by the contact of said high-speed brush on said commutator is reduced, said convex shaped end of said high-speed brush further adapted to wear to take the shape of said commutator, said electrically resultant contact point located at a first predetermined angular distance from an electrical contact point of said low-speed brush such that said electrically resultant contact point moves angularly closer to said electrical contact point of said low-speed brush and said high-speed rotational output of said armature decreases as said high-speed brush wears.

2. A two speed direct current electric motor as set forth in claim 1 wherein said high-speed brush is operatively disposed within a high-speed brush holder, said high-speed brush holder radially offset from said commutator.

3. A two speed direct current electric motor as set forth in claim 2 wherein said low speed brush is operatively disposed within a low speed brush holder and said common brush is operatively disposed within a common brush holder, each said brush holder having a biasing member adapted to provide biasing force so that said common brush, said low speed brush, and said high-speed brush are continuously pressed into physical and electrical contact with said commutator.

4. A two speed direct current electric motor as set forth in claim 2 wherein said high-speed brush holder is radially offset from said commutator in the range of 5 to 10 degrees.

5. A two speed direct current electric motor as set forth in claim 1 that further includes a gear reduction assembly to provide a stepped down motor output.

6. A two speed direct current electric motor as set forth in claim 5 wherein said gear reduction assembly includes a drive wheel having teeth formed about its outer circumference and an output shaft, said armature including a worm gear that operatively interacts with said teeth of said drive wheel to cause said output shaft to rotate in response to the rotation of said armature in a predetermined gear reduction ratio.

7. A two speed direct current electric motor as set forth in claim 1 wherein said convex shaped end of said high-speed brush is shaped to geometrically form a radiused convex curve, said convex curve defined as a chord having a radius in the range of 5 to 10 mm.

8. A two speed direct current electric motor as set forth in claim 1 wherein said motor is a permanent magnet type of direct current motor.

9. A two speed direct current electric motor comprising:
an armature having a commutator, said commutator adapted to receive an electromotive force to cause said armature to operatively rotate;
a brush assembly having a common brush and a low-speed brush that is disposed about and in electrical communication with said commutator and adapted to provide a first electromotive force to cause said armature to provide a low-speed rotational output;
said brush assembly further including a high-speed brush having a convex shaped end in physical and electrical communication with said commutator to provide a second electromotive force to cause said armature to provide a high-speed rotational output, said high-speed brush radially offset from said commutator such that said convex shaped end and said radial offset of said high-speed brush provide an electrically resultant contact point with respect to said commutator that is off-center of said high-speed brush so that the drag placed on said armature by the contact of said high-speed brush on said commutator is reduced, said electrically resultant contact point located at a first predetermined angular distance from an electrical contact point of said low speed brush such that said electrically resultant contact point moves angularly closer to said electrical contact point of said low speed brush and said high-speed rotational output of said armature decreases as said high-speed brush wears; and
a gear reduction assembly adapted to cause said motor to rotate in response to the rotation of said armature in a predetermined gear reduction ratio.

10. A two speed direct current electric motor as set forth in claim 9 wherein said gear reduction assembly further includes a drive wheel having teeth formed about its outer circumference and an output shaft, and said armature further includes a worm gear that operatively interacts with said teeth of said drive wheel to cause said output shaft to rotate in response to the rotation of said armature in a predetermined gear reduction ratio.

11. A windshield wiper assembly comprising:
a pair of wiper assemblies adapted to be moved reciprocally across a windshield of a vehicle, each said wiper assembly carried by a corresponding wiper arm assembly;
a two speed direct current electric motor adapted to drive said wiper arm assemblies, said motor having an armature with a commutator, said commutator adapted to receive an electromotive force to cause said armature to operatively rotate;
a brush assembly having a common brush and a low-speed brush that is disposed about and in electrical communication with said commutator and adapted to provide a first electromotive force to cause said armature to provide a low-speed rotational output; said brush assembly further including a high-speed brush having a convex shaped end in physical and electrical communication with said commutator to provide a second electromotive force to cause said armature to provide a high-speed rotational output, said high-speed brush radially offset from said commutator such that said convex shaped end and said radial offset of said high-speed brush provide an electrically resultant contact point with respect to said commutator that is off center of said high-speed brush so that the drag placed on said armature by the contact of said high-speed brush on said commutator is reduced, said convex shaped end of said high-speed brush further adapted to wear to take the shape of said commutator, said electrically resultant contact point located at a first predetermined angular distance from an electrical contact point of said low-speed brush such that said electrically resultant contact point moves angularly closer to said electrical contact point of said low-speed brush and said high-speed rotational output of said armature decreases as said high-speed brush wears.

12. A windshield wiper assembly as set forth in claim 11 wherein said high-speed brush is operatively disposed within a high-speed brush holder, said high-speed brush holder radially offset from said commutator.

13. A windshield wiper assembly as set forth in claim 12 wherein said low speed brush is operatively disposed within a low speed brush holder and said common brush is operatively disposed within a common brush holder, each said brush holder having a biasing member adapted to provide biasing force so that said common brush, said low speed brush, and said high-speed brush are continuously pressed into physical and electrical contact with said commutator.

14. A windshield wiper assembly as set forth in claim 12 wherein said high-speed brush holder is radially offset from said commutator in the range of 5 to 10 degrees.

15. A windshield wiper assembly as set forth in claim 11 that further includes a gear reduction assembly to provide a stepped down motor output.

16. A windshield wiper assembly as set forth in claim 15 wherein said gear reduction assembly includes a drive wheel having teeth formed about its outer circumference and an output shaft, said armature including a worm gear that operatively interacts with said teeth of said drive wheel to cause said output shaft to rotate in response to the rotation of said armature in a predetermined gear reduction ratio.

17. A windshield wiper assembly as set forth in claim 11 wherein said convex shaped end of said high-speed brush is shaped to geometrically form a radiused convex curve, said convex curve defined as a chord having a radius in the range of 5 to 10 mm.

18. A windshield wiper assembly as set forth in claim 11 wherein said motor is a permanent magnet type of direct current motor.

* * * * *